US010024104B2

(12) United States Patent
Wu et al.

(10) Patent No.: US 10,024,104 B2
(45) Date of Patent: Jul. 17, 2018

(54) IMPROVING GEOSTEERING INVERSION USING LOOK-AHEAD LOOK-AROUND ELECTROMAGNETIC TOOL

(71) Applicant: Halliburton Energy Services, Inc., Houston, TX (US)

(72) Inventors: Hsu-Hsiang Wu, Sugar Land, TX (US); Burkay Donderici, Houston, TX (US); Jason D. Dykstra, Spring, TX (US); Yuzhen Xue, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/904,940

(22) PCT Filed: Dec. 31, 2014

(86) PCT No.: PCT/US2014/073065
§ 371 (c)(1),
(2) Date: Jan. 13, 2016

(87) PCT Pub. No.: WO2016/108913
PCT Pub. Date: Jul. 7, 2016

(65) Prior Publication Data
US 2017/0306701 A1      Oct. 26, 2017

(51) Int. Cl.
*G01V 1/40* (2006.01)
*G01V 3/18* (2006.01)
(Continued)

(52) U.S. Cl.
CPC ............... *E21B 7/022* (2013.01); *E21B 7/06* (2013.01); *G06F 9/455* (2013.01); *G06G 7/48* (2013.01); *E21B 44/00* (2013.01)

(58) Field of Classification Search
CPC .... E21B 49/00; E21B 47/06; E21B 2049/085; E21B 43/26; E21B 47/101; E21B 47/123;
(Continued)

(56) References Cited

U.S. PATENT DOCUMENTS

| 6,092,610 A | 7/2000 | Kosmala et al. |
| 6,158,529 A | 12/2000 | Dorel |

(Continued)

FOREIGN PATENT DOCUMENTS

| WO | WO-2009029517 A2 | 3/2009 |
| WO | WO-2013123293 A1 | 8/2013 |

(Continued)

OTHER PUBLICATIONS

Michael Rabinovich et al, The Vagaries and Myths of Look-Around Deep-Resistivity Measurements While Drilling, Apr. 2012, 16 pages, vol. 53. No. 2, Petrophysics.

(Continued)

*Primary Examiner* — Roy Y Yi

(57) ABSTRACT

System and methods for performing look-ahead and look-around (LALA) inversion are provided. Measurements of formation properties accumulated by a downhole LALA tool are obtained during different stages of drilling a wellbore through layers of an underground formation. A distribution of formation properties measured for the layers behind a current layer is determined. A formation model for look-ahead inversion is defined based on the determined distribution of formation properties behind the current layer. Measurements of the current layer's formation properties collected by the downhole LALA tool are obtained. A distribution of formation properties for one or more layers ahead of the current layer is estimated based on the formation model and the measurements of formation properties obtained for the current layer. The estimated distribution (Continued)

includes a gradient transition of formation properties between the current layer and the one or more layers ahead of the current layer.

20 Claims, 10 Drawing Sheets

(51) Int. Cl.
| | |
|---|---|
| *G01V 5/04* | (2006.01) |
| *G01V 9/00* | (2006.01) |
| *E21B 7/02* | (2006.01) |
| *G06G 7/48* | (2006.01) |
| *G06F 9/455* | (2018.01) |
| *E21B 7/06* | (2006.01) |
| *E21B 44/00* | (2006.01) |

(58) Field of Classification Search
CPC ........ E21B 49/10; E21B 10/42; E21B 10/567; E21B 10/5735; E21B 2023/008; E21B 21/003; E21B 21/08; E21B 21/103; G06F 17/5086; G06F 19/324; G06F 19/3406; G06F 19/345; G06F 19/3456; G06F 1/16; G06F 21/32; G06F 21/6245; G06F 2203/0338; G06F 2203/04104; G06F 2203/04808; G06F 2217/16; G06F 2221/2111; G06F 17/30256; G06F 17/3028; G06F 3/013; G06F 17/3259; G06F 17/30654; G06F 17/30766; G06F 17/5009; G06F 19/322; G06F 1/163; G06F 3/005; G06F 3/012; G06F 3/0416; G06F 3/0482; G06F 5/10
See application file for complete search history.

(56) References Cited

U.S. PATENT DOCUMENTS

| | | | |
|---|---|---|---|
| 6,188,222 B1 * | 2/2001 | Seydoux | ............... E21B 47/12 |
| | | | 175/50 |
| 6,594,584 B1 | 7/2003 | Omeragic et al. | |
| 7,999,695 B2 | 8/2011 | Rodney et al. | |
| 8,060,310 B2 | 11/2011 | Tabarovsky et al. | |
| 8,489,375 B2 | 7/2013 | Omeragic et al. | |
| 8,736,270 B2 | 5/2014 | Seydoux et al. | |
| 2009/0157367 A1 | 6/2009 | Meyer et al. | |
| 2009/0260876 A1 | 10/2009 | Gleitman | |
| 2010/0156424 A1 | 6/2010 | Bittar et al. | |
| 2011/0106514 A1 * | 5/2011 | Omeragic | .............. G01V 11/00 |
| | | | 703/10 |
| 2011/0133740 A1 | 6/2011 | Seydoux et al. | |
| 2011/0238312 A1 | 9/2011 | Seydoux et al. | |
| 2012/0273270 A1 | 11/2012 | Rasheed | |
| 2012/0298420 A1 | 11/2012 | Seydoux et al. | |
| 2013/0141102 A1 | 6/2013 | Donderici et al. | |
| 2014/0249754 A1 | 9/2014 | Donderici et al. | |
| 2015/0309201 A1 | 10/2015 | Wu et al. | |

FOREIGN PATENT DOCUMENTS

| | | |
|---|---|---|
| WO | WO-2014003701 A1 | 1/2014 |
| WO | WO-2014098840 A1 | 6/2014 |
| WO | WO-2014178871 A1 | 11/2014 |

OTHER PUBLICATIONS

Katie Mazerov, Minimizing uncertainty: Geosteering advances keep wellbores in sweet spot, Jan. 1, 2016, http://www.drillingcontractor. org/minimizing-uncertainty-geosteering-advances-keep-wellbores-in-sweet-spot-8777, 6 pages, Drilling Contractor.
International Search Report and Written Opinion, dated Sep. 25, 2015, 11 pages, Korean International Searching Authority.

* cited by examiner

IMPROVING GEOSTEERING INVERSION USING LOOK-AHEAD LOOK-AROUND ELECTROMAGNETIC TOOL

CROSS-REFERENCE TO RELATED APPLICATIONS

This application is a U.S. National Stage patent application of International Patent Application No. PCT/US2014/073065, filed on Dec. 31, 2014, the benefit of which is claimed and the disclosure of which is incorporated herein by reference in its entirety.

FIELD OF THE DISCLOSURE

The present disclosure relates generally to hydrocarbon exploration and production, and particularly, to geosteering inversion techniques for directional drilling operations in hydrocarbon exploration and production.

BACKGROUND

Geosteering is known as the process of adjusting the deviation of a wellbore to steer a downhole tool in a desired direction or toward a predetermined target location within an underground reservoir formation. This process generally requires petrophysicists to analyze real-time measurements of various downhole tools so that geological information surrounding the wellbore can be understood and thereby optimized wellbore development can be achieved in real-time. Geosteering inversion based on numerical optimization techniques (e.g., Gauss-Newton gradient inversion) also may be utilized to invert formation geology and minimize any discrepancy between a downhole tool's measurements and forward modeling responses based on the inversion. Such inversion techniques may provide petrophysicists with a way to quickly estimate formation properties in real-time. However, conventional inversion techniques may produce unreliable estimates when, for example, the downhole tool's measurements are not sufficiently sensitive to the targeted formation or the varying formation properties between different formation layers are difficult to distinguish. Without reliable estimates of formation properties, the inversion might fail to produce an effective formation model that minimizes discrepancy between the modeled formation properties and the observed real-world properties of the actual formation.

DESCRIPTION OF ILLUSTRATIVE EMBODIMENTS

Figure 1:
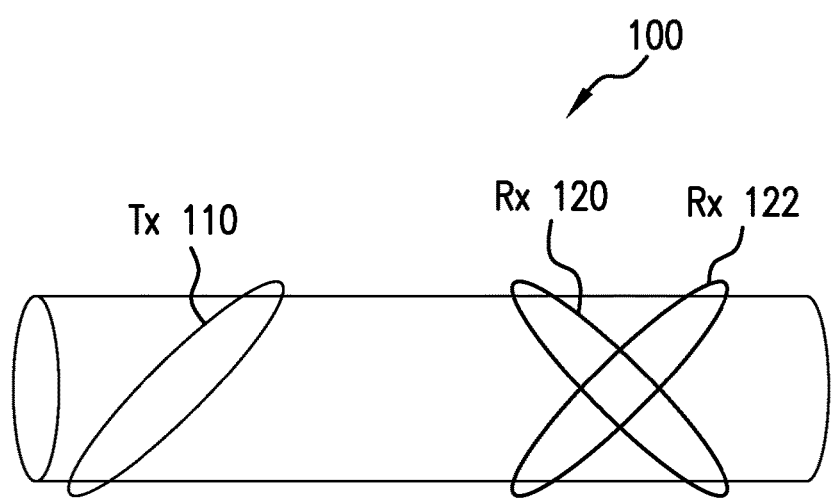
FIG. 1 illustrates an exemplary downhole Look-Ahead Look-Around (LALA) tool with a tilted antenna configuration.

Embodiments of the present disclosure relate to performing a knowledge-based look-ahead inversion for geosteering based on measurements from a downhole look-ahead look-around (LALA) tool. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. In the detailed description herein, references to "one or more embodiments," "an embodiment," "an example embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Embodiments of the present disclosure relate to systems and techniques for performing a knowledge-based inversion with gradient transition profiles between formation layers to improve look-ahead performance and geosteering accuracy during directional drilling. In one or more embodiments, a downhole LALA tool may be configured to measure various properties of an underground formation during a drilling operation for the exploration and/or production of hydrocarbon deposits from a reservoir within the formation. Such a LALA tool may be, for example, an electromagnetic resistivity tool for measuring the formation's resistivity in areas ahead of the tool (look-ahead) and surrounding the tool (look-around). However, it should be noted that embodiments are not intended to be limited thereto and that the disclosed embodiments may be applied to other types of LALA tools, e.g., acoustic or ultrasonic tools. Further, it should be noted that such tools may be used to measure other types of formation properties, e.g., permeability, permittivity, etc.

As will be described in further detail below, the knowledge-based look-ahead inversion techniques disclosed herein may utilize shallow and ultra-deep measurements from the LALA tool to define formation properties in layers behind a tool reference point and predict formation properties in layers ahead. Measurements within a certain depth range may be obtained from the tool and analyzed on the basis of signal derivation, variance, or other signal characteristics to provide detailed information for the inversion. In one or more embodiments, a forward model with a look-ahead profile window representing a gradient transition of formation properties in layers ahead of the tool reference may be used for the look-ahead inversion. Similarly, look-around profile windows for areas of the formation above and below the tool reference may also be used for the inversion. Further, the disclosed look-ahead inversion techniques may be combined with various processing schemes and complex formation models suitable for exploring formation properties at varying depths. In some implementations, the disclosed techniques may be used in an automated closed loop drilling system for enabling automated proactive geosteering in real-time applications.

It should be appreciated that embodiments of the present disclosure may be applicable to horizontal, vertical, deviated, multilateral, u-tube connection, intersection, bypass (drilled around a mid-depth "stuck fish" and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to any particular implementation are not intended to be limiting.

Illustrative embodiments and related methodologies of the present disclosure are described below in reference to FIGS. 1-11 as they might be employed, for example, in a computer system or automated control unit of a drilling rig for performing knowledge-based geosteering inversion based on measurements from a downhole LALA tool. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 shows an example of a LALA tool 100 with an antenna structure including a tilted transmitter coil 110 and two tilted receiver coils 120 and 122. Transmitter coil 110 in this example may be configured to transmit look-ahead and/or look-around signals that propagate through different areas of a surrounding rock formation. Receiver coils 120 and 122 may be configured to receive the transmitted signal(s). While only transmitter coil 110 and receiver coils 120 and 122 are shown in the FIG. 1, it should be noted that additional transmitter and/or receiver coils with different orientation and tilt angles may be used as desired for a particular implementation. In one or more embodiments, LALA tool 100 may be integrated into a bottom-hole assembly at the end of a drill string. A drilling assembly including the drill string and bottom-hole assembly may be connected to a drilling rig and disposed within a wellbore being drilled through different layers of the rock formation. For example, LALA tool 100 may be part of a measurement or logging section of the bottom-hole assembly. In one or more embodiments, LALA tool 100 may be in the form of a drill collar located immediately before a drill bit at a distal end of the bottom-hole assembly. LALA tool 100 may be used to collect measurements of formation properties at different depths as the drill bit extends the wellbore through the formation during the drilling operation. The measurements collected by LALA tool 100 may also include, for example, data relating to its own orientation, position, and any other relevant operating conditions.

In one or more embodiments, the measurements collected by LALA tool 100 may be sent to a control unit (not shown) located at the surface. The measurements obtained from LALA tool 100 may be processed by the control unit to determine formation resistivity and/or other formation properties of interest. The processing performed by the control unit may include, for example, generating a formation model for look-ahead inversion. The results of the look-ahead inversion may then be used to make appropriate geosteering decisions, e.g., for adjusting or optimizing a planned path of the wellbore being drilled through the formation. The measurements may be transferred from LALA tool 100 to the control unit via, for example, a telemetry system, wired communication pathway, or wireless connection between LALA tool 100 and the control unit. Alternatively, the control unit may be integrated within the bottom-hole assembly itself to automate the geosteering process and adjust/optimize the planned wellbore path in real time during the drilling operation, as will be described in further detail below with respect to FIG. 11.

In one or more embodiments, LALA tool 100 may use transmitter coil 110 and receiver coils 120 and 122 to induce an electromagnetic field into the surrounding formation for measuring the formation's resistivity in areas ahead of the tool (look-ahead) and areas above and below the tool (look-around). For example, the look-ahead and/or look-around signals transmitted and received by LALA tool 100 may be in the form of an electromagnetic signal including look-ahead and look-around components that propagate through the surrounding formation. However, it should be noted that LALA tool 100 may be adapted to transmit and receive other types of signals, e.g., acoustic or ultrasonic signals, for measuring other types of formation properties, as desired for a particular implementation.

In the above example, the look-ahead signal may be only a small portion of a total LALA signal produced by LALA tool 100 and therefore, may be difficult to distinguish from the look-around portion of the total LALA signal. Without good differentiation between look-ahead and look-around signals, look-ahead inversion based on measurements from LALA tool 100 may fail to produce reliable inversion results that can be used for proactive geosteering during the drilling operation. Thus, embodiments of the present disclosure may utilize a downhole LALA tool configuration that enables a knowledge-based inversion process in which look-ahead signals can be effectively differentiated from look-around signals based on the measurements collected by the downhole tool.

Figure 2:
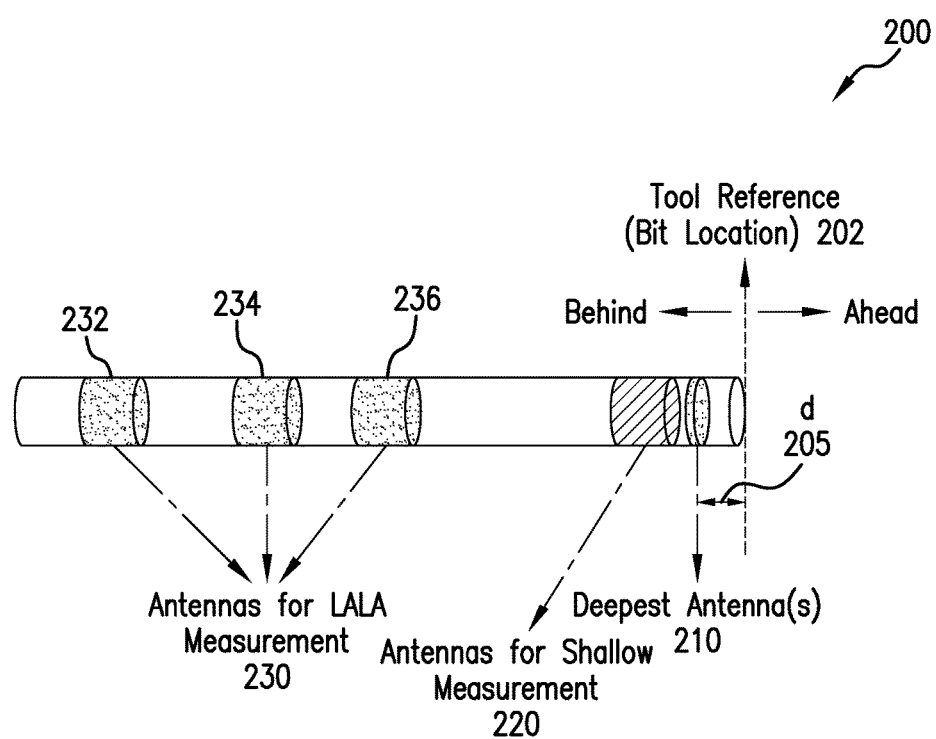
FIG. 2 illustrates an exemplary configuration of a downhole LALA tool for enabling a knowledge-based LALA inversion for geosteering.

FIG. 2 illustrates an exemplary configuration of a downhole LALA tool 200 for enabling the knowledge-based geosteering inversion techniques disclosed herein. Like LALA tool 100 of FIG. 1, described above, LALA tool 200 may be integrated into a bottom-hole assembly at the end of a drill string disposed within a wellbore being drilled through a rock formation. In one or more embodiments, LALA tool 200 may have a designated reference point or location (or "tool reference") 202 relative to which a current depth of LALA tool 200 within the formation may be measured during the drilling operation. Tool reference 202 may correspond to, for example, the location of a drill bit (not shown) at the distal end of the bottom-hole assembly.

As shown in FIG. 2, LALA tool 200 may include a plurality of antennas 210, 220, and 230 positioned at different locations throughout LALA tool 200 for collecting measurements of formation properties at various depths relative to tool reference 202. The measured formation properties may include, but are not limited to, formation resistivity in areas ahead of and behind tool reference 202. Each of antennas 210, 220, and 230 may be, for example, one or a set of antennas that can function as a transmitter or receiver of electromagnetic signals propagated through the formation. In one or more embodiments, antennas 210, 220, and 230 may have coils that can be tilted to focus electromagnetic fields through the formation at varying ranges of depth around LALA tool 200 and ahead of tool reference 202. It should be appreciated that such tilted coil antennas may be placed in any of various angles or orientations within LALA tool 200, as desired for a particular implementation.

Antenna(s) 210 in this example may represent the deepest of the antennas of LALA tool 200. To maximize the depth of measurement ahead of tool reference 202, antenna(s) 210 may be positioned near the drill bit such that a distance 205 between antenna 210 and the drill bit is zero or as close as possible thereto. Antennas 220 may be used to acquire shallow measurements of formation properties within a limited range of detection in an area behind tool reference 202. Antennas 220 may be positioned at a predetermined radial distance (e.g., on the order of one to four feet) above the deepest antenna(s) 210, depending on the frequency and resolution of the electromagnetic field produced by antennas 220 for acquiring the shallow measurements. Antennas 230 may be used to acquire ultra-deep or LALA measurements of formation properties within an extended range of detection surrounding LALA tool 200. As shown in FIG. 2, antennas 230 may include multiple antennas 232, 234, and 236, which may be separated from the deepest antenna(s) 210 by a predetermined distance (e.g., ranging from 5 feet to 100 feet) according to their respective operating frequencies and the desired detection ranges. In one or more embodiments, each of antennas 232, 234, and 236 may be a set of antennas including multiple antennas for attaining a desired detection range using ultra-deep signals.

In one or more embodiments, the shallow and ultra-deep measurements collected by LALA tool 200 may be used to generate a multi-layered formation model for performing look-ahead inversion. Such measurements may be used, for example, to effectively differentiate look-ahead signals from look-around signals in the inversion. In one or more embodiments, the shallow measurements from LALA tool 200 may be used to determine the formation properties in surrounding areas behind tool reference 202 with a relatively high degree of precision while the ultra-deep measurements may be used to determine formation properties in areas ahead of tool reference 202. The well-differentiated look-ahead signal and relatively precise formation properties derived from the shallow measurements may then be utilized in a knowledge-based look-ahead inversion technique for providing improved forward modeling responses and geosteering performance, as will be described in further detail below with respect to FIG. 3.

Figure 3:
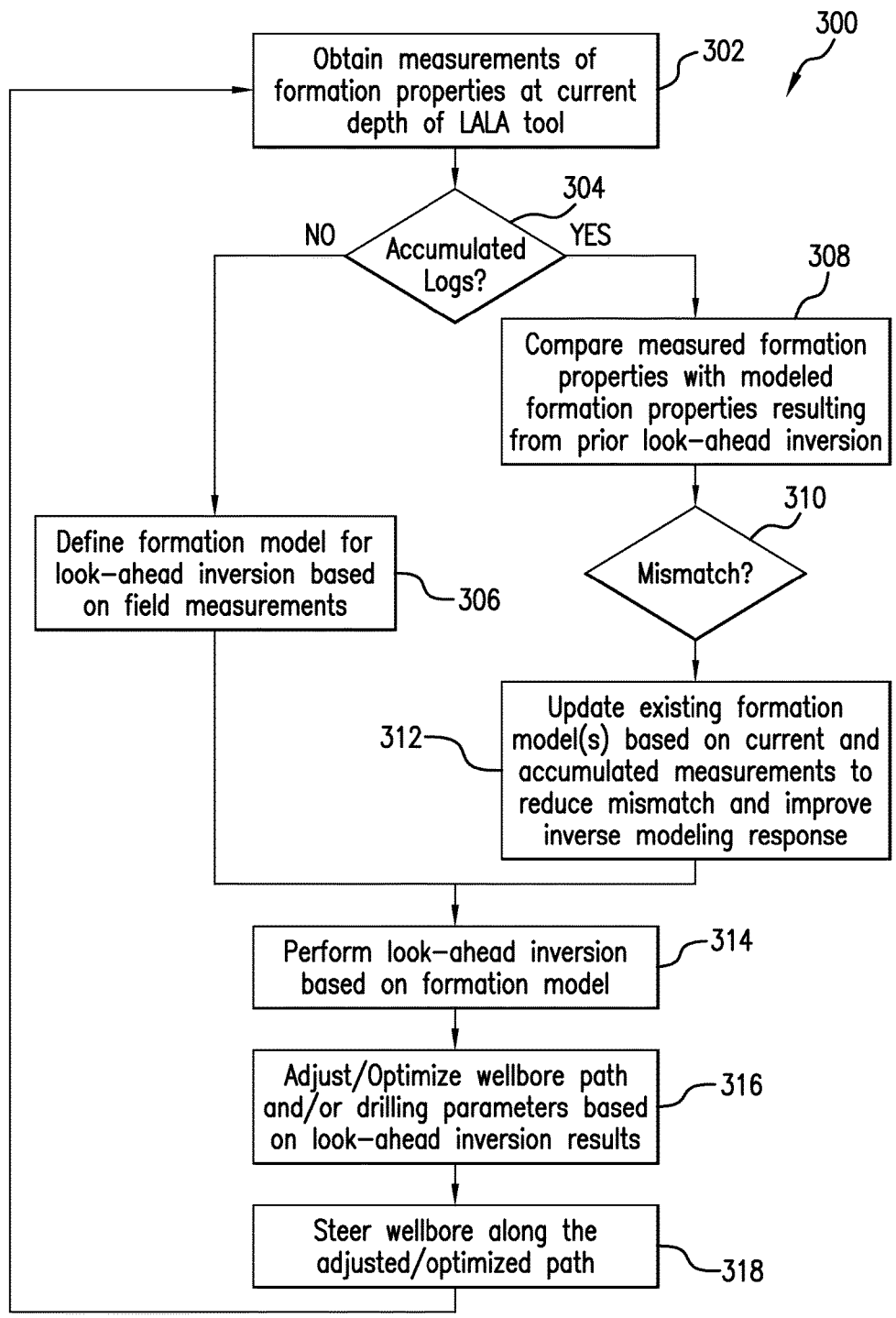
FIG. 3 is a flowchart of an exemplary method for performing knowledge-based LALA inversion based on measurements from a downhole LALA tool.

FIG. 3 is a process flowchart of an exemplary method 300 for performing a knowledge-based LALA inversion based on measurements of underground formation properties from a downhole LALA tool. In one or more embodiments, the LALA tool may be specially configured to provide the appropriate measurements needed to perform the knowledge-based inversion during a drilling operation. For example, the steps of method 300 may be performed based on measurements obtained from LALA tool 200 of FIG. 2, as described above. However, method 300 is not intended to be limited thereto. The results of the knowledge-based inversion may be used to make appropriate decisions for geosteering the wellbore and LALA tool disposed therein during the drilling operation.

In the example shown in FIG. 3, method 300 begins in step 302, which includes obtaining measurements of formation properties for a current depth of the LALA tool within the formation. The current depth of the LALA tool may be based on a reference location designated for the tool. As described above, the reference location may correspond to, for example, a point along the LALA tool at or near the drill bit of the associated drilling assembly used to drill the wellbore. In one or more embodiments, the LALA tool may be configured to periodically log measurements of formation properties at various depths as the wellbore is drilled through different layers of the formation. Thus, the measurements obtained in step 302 may reflect the formation properties in a current layer of the formation measured by the LALA tool at any stage of the drilling process.

In one or more embodiments, the measurements logged at each stage of the drilling operation may be accumulated over the course of the drilling operation. The accumulated logs may be stored, for example, in a local memory or storage device coupled to the downhole LALA tool. Additionally or alternatively, the logged measurements may be transferred via a wired connection or other communication pathway from the tool to a control unit located at the surface for processing and storage. In one or more embodiments, the steps of method 300 may be performed by a processing system of the control unit at the surface based on the measurements collected by the downhole LALA tool. Alternatively, the processing system and control unit may be implemented as a downhole component of the drilling assembly for automatically performing the LALA inversion techniques disclosed herein and geosteering the wellbore based on the measurements obtained in real-time from the LALA tool. In some implementations, some of the processing may be performed at the surface, e.g., by a surface control unit, and some may be performed downhole, e.g., by an automated downhole control unit of the drilling assembly. An example of such an automated downhole control unit will be described in further detail below with respect to FIG. 11.

As described above, the measurements collected by the LALA tool may include LALA or ultra-deep measurements of formation properties that are sensitive to look-ahead and look-around signals over a relatively wide detection range extending from the LALA tool as well as shallow measurements of formation properties that are sensitive to LALA signals only within a limited area surrounding the tool, owing to the relatively short detection range of the antennas that may be used to acquire such measurements.

Once the measurements are obtained for the current depth, method 300 may proceed to step 304, which includes determining whether or not any logged measurements of formation properties at prior depths have been accumulated. The number of logs that have been accumulated may provide an indication of when the measurements obtained in step 302 were collected by the LALA tool. For example, if it is determined in step 304 that no accumulated logs exist (e.g., no logs are stored in memory), it may be assumed that these measurements were collected by the LALA tool at the beginning of the drilling operation during an initial stage of drilling the wellbore. Method 300 in this case may then proceed to step 306, in which a formation model for look-ahead and/or look-around inversion may be defined based on the measurements obtained in step 302.

In the steps following step 306, a look-ahead inversion may be performed (step 314) with the formation model to estimate formation properties ahead of the tool's reference location (and drill bit) and make any adjustments to the planned wellbore path (step 316) as well as to the operating parameters of the drilling assembly for steering the wellbore (step 318) according to the adjusted path. As this may be an initial stage of the drilling operation, the measurements obtained in step 302 may be representative of formation properties at only one depth or within a limited depth range. Consequently, the formation model defined in step 306 may be a simplified two-layer LALA formation model. Also, the look-ahead inversion in this example may be a point-to-point inversion performed with the simplified two-layer model to roughly approximate formation properties ahead of the tool's reference location. As will be described in further detail below, the simplified two-layer model may be updated or refined as measurements of formation properties at additional depths are accumulated during subsequent stages of the drilling operation. In this way, the formation model defined in step 306 may serve as an initial model and starting point for a more complex formation model and look-ahead inversion scheme using the multi-depth measurements obtained during the drilling operation.

In a different example, it may be determined in step 304 that accumulated logs of formation property measurements at prior depths do exist. In this case, method 300 may proceed to step 308, in which the measured formation properties at the current depth are compared with the estimated or predicted formation properties resulting from a prior look-ahead inversion based on a current formation model (e.g., as defined previously in step 306). In step 310, it may be determined that there is a deviation or mismatch between the predicted formation properties and measured properties based on the comparison. In step 312, the current formation model may be updated or refined based on the measurements obtained in step 302 and from the accumulated logs. The formation model may be updated so as to reduce the mismatch and improve the forward modeling response when the look-ahead inversion (step 314) is performed again using the updated model.

In one or more embodiments, step 312 may include defining portions of the updated formation model representing the distribution of formation properties across layers of the formation behind and ahead of the current layer being measured. The measured formation properties may include, for example and without limitation, formation resistivity. The measurements obtained in step 302 from the LALA tool may be converted to formation resistivity values. It should be noted that the conversion might be performed using any of various processing schemes including, but not limited to, resistivity conversion charts, inversion, or other processing schemes.

In one or more embodiments, the shallow measurements from the accumulated logs may be used in step 312 to define a different portion of the formation model representing formation properties in layers behind the current layer and the tool's reference location. In one or more embodiments, step 312 may include performing a one-dimensional (1D) inversion of the current layer's formation resistivity based on the shallow measurements to determine a distribution of formation resistivity (or "resistivity profile") for different layers of the formation model at depths above or before the location of the tool reference within the current layer. Such a prior multi-layered formation model may be used in the look-ahead inversion to help reduce or eliminate shoulder-bed effects of nearby formation layers behind the tool's reference location.

Additionally, the LALA or ultra-deep measurements from the accumulated logs may be used in step 312 to define a portion of the formation model representing a distribution of formation properties (e.g., formation resistivity) across one or more layers ahead of the current layer and location of the tool's reference. Step 312 may include approximating a distribution of formation resistivity in one or more layers ahead of the tool reference location based on the ultra-deep measurements. In one or more embodiments, such a "look-ahead profile" of formation resistivity (and/or other formation properties) may be predefined for the formation model based on an analysis of the ultra-deep measurements. For example, the ultra-deep measurements from the accumulated logs may be analyzed on the basis of LALA signal derivatives, signal variances or other signal characteristics and then processed using any of various signal processing schemes using a linear scale and/or a logarithmic scale. In one or more embodiments, the processed LALA/ultra-deep measurements may be used during different stages of the drilling operation to estimate or predict relatively higher or lower resistivity values ahead of the tool's reference location. Accordingly, the predefined look-ahead profile of the formation model in this example may be used as a constraint or regulation in the look-ahead inversion for estimating formation resistivity profiles ahead of the reference location.

As described above with respect to step 306, the steps following step 312 may include performing a look-ahead inversion (step 314) based on the current (and now updated) formation model to estimate formation properties ahead of the tool's reference location (and drill bit). The results of the look-ahead inversion may then be used to adjust or optimize the planned wellbore path (step 316) in addition to one or more operating parameters of the drilling assembly for steering the wellbore (step 318) according to the adjusted/optimized path. In contrast to the inversion and adjustment steps performed previously, the look-ahead inversion performed following step 312 may be, for example, a knowledge-based look-ahead inversion based on the updated formation model including the predefined profiles of formation properties distributed across different layers behind and ahead of the tool's reference location, as described above.

As described above with respect to steps 308, 310 and 312, the current look-ahead formation model may be further refined or updated during subsequent stages of the drilling operation to improve the match between the modeled formation properties resulting from the look-ahead inversion and the measured formation properties for additional layers ahead of the tool's reference location. The results of the look-ahead inversion based on the formation model may include, for example and without limitation, a current formation layer resistivity ("Rt") at the tool's reference location, a look-ahead resistivity ("Rs") of the formation layer ahead of the reference location, and a distance from the reference location to the next formation layer ahead (also referred to as the "distance to bed boundary" or "DTBB").

Additional features and characteristics of various formation models for performing look-ahead inversion will be described in further detail below with respect to the examples provided in FIGS. 4-10. For purposes of discussion and explanation, the examples in FIGS. 4-10 will be described in the context of look-ahead and/or look-around inversion models based on measurements of formation resistivity obtained from a downhole LALA tool (e.g., an electromagnetic resistivity tool). However, embodiments of the present disclosure are not intended to be limited thereto.

Figure 4:
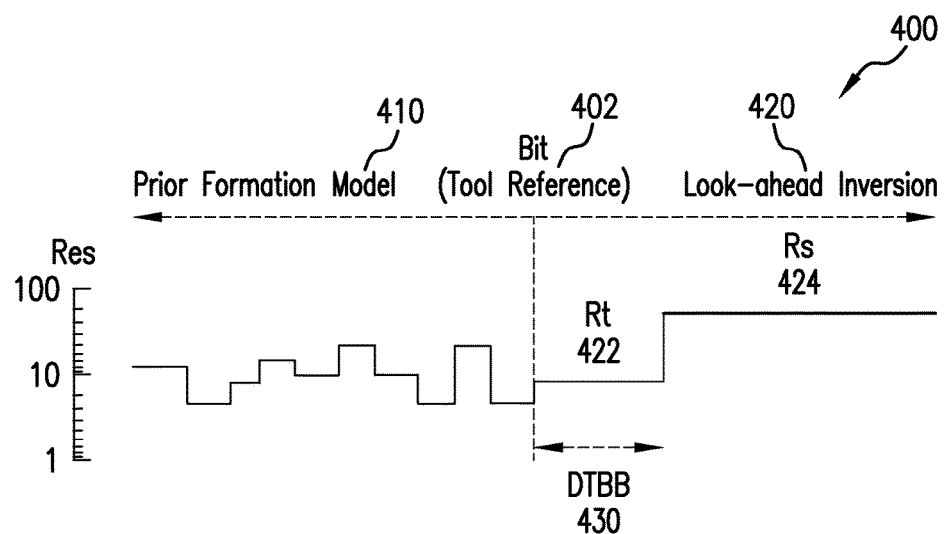
FIG. 4 illustrates an exemplary resistivity profile of a formation model for performing look-ahead inversion with inverted prior multi-layers behind a LALA tool's reference location.

FIG. 4 illustrates an exemplary resistivity profile for different layers of a formation model 400 for performing look-ahead inversion based on measurements from a downhole LALA tool (e.g., LALA tool 200 of FIG. 2, as described above). As shown in FIG. 4, model 400 may include a resistivity profile 410 representing a distribution of formation resistivity over multiple formation layers behind a current depth of the LALA tool corresponding to a tool reference location 402 within the formation. In one or more embodiments, resistivity profile 410 may be derived by performing a formation resistivity (Rt) 1D inversion based on shallow measurements of formation properties collected by the LALA tool at various depths over the course of the drilling operation. Also, as shown in FIG. 4, model 400 may include a look-ahead profile 420 representing a distribution of formation resistivity between the current layer in which the LALA tool is located and one or more layers ahead of tool reference 402. Look-ahead profile 420 may include, for example, a resistivity (Rt) 422 of the current layer of the formation being measured and a resistivity (Rs) 424 of a shoulder-bed layer ahead of the current layer. In one or more embodiments, the results of the look-ahead inversion performed using formation model 400 may include a distance to the shoulder bed boundary (DTBB) 430 determined based on resistivity (Rt) 422 of the current formation layer and resistivity (Rs) 424 of the formation layer ahead.

As described above, the look-ahead signal may be a smaller proportion of the total received signal relative to the look-around signal. To effectively separate the look-ahead signal from the look-around signal, a set of constraints or regulations may be needed in the look-ahead inversion. In general, resistivity logs from an offset well can be utilized as prior information in the look-ahead inversion. Such prior information included in the inversion may enable good differentiation between look-ahead and look-around signals. However, this approach to signal differentiation may fail to produce good results if, for example, the offset well is far away from the drilling well in which the LALA tool is employed or the assumption of formation continuity between wells is false due to faults or complicated formation geology that have not been taken into account.

Furthermore, look-ahead inversion results may be unstable due to a lack of information regarding the formation properties near and behind the location of the drill bit when, for example, the LALA tool is located in a thin-layered formation where resistivity contrasts between different formation layers may be difficult to distinguish. For example, resistivity contrasts between the layers of such a formation may be too insubstantial to detect. As a result, the tool's capability to explore desired formation layers ahead of the current layer with different (i.e., higher or lower) resistivity profiles than that of the current layer may be compromised by shoulder-bed effects of nearby formation layers around and/or behind the tool. For such thin-layered formations, look-ahead inversion based on a two-layer look-ahead profile, such as profile 420 of formation model 400, may produce unreliable results for exploring desired formation layers ahead of the LALA tool. Formations with gradient resistivity profiles may also pose significant challenges for exploring targeted formation layers using LALA inversion based on such a two-layer look-ahead model. Thus, as will be described in further detail below with respect to FIGS. 5-10, formation models with gradient resistivity profiles may be used with the disclosed LALA inversion techniques to achieve improved look-ahead performance with respect to such complex formations.

Figure 5:
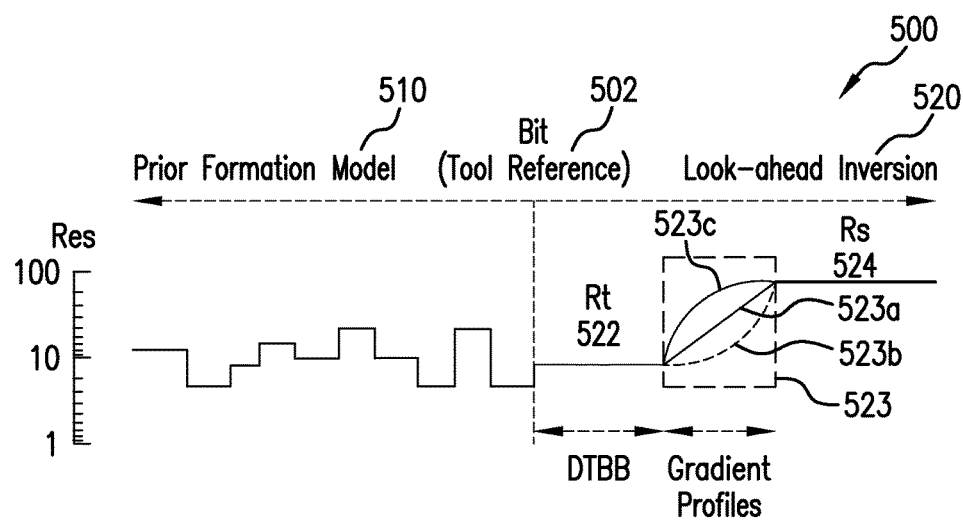
FIG. 5 illustrates an exemplary resistivity profile of a formation model for performing look-ahead inversion with inverted prior multi-layers behind a LALA tool's reference location and a gradient resistivity transition for layers ahead.

FIG. 5 illustrates an exemplary resistivity profile of a formation model 500 for performing look-ahead inversion with multiple formation layers behind a tool reference and a gradient resistivity transition between the current layer and layers ahead of the tool reference. As shown in FIG. 5, formation model 500 includes a resistivity profile 510 representing a distribution of formation resistivity over multiple formation layers before or behind a tool reference 502. Model 500 also includes a look-ahead profile 520 representing a distribution of formation resistivity between the current layer and the layers ahead of the current layer. In one or more embodiments, look-ahead profile 520 includes a profile window 523 for representing a gradient resistivity transition between a resistivity (Rt) 522 of a first formation layer (e.g., the current formation layer) and a resistivity (Rs) 524 of a second formation layer (e.g., the next formation layer ahead of the current layer). For example, any one of various gradient resistivity profiles may be used in profile window 523 to represent the formation resistivity within a transition area between the first and second formation layers. The gradient resistivity profile used in profile window 523 may be, for example, a linear or first-degree polynomial gradient resistivity profile 523a or either of second-degree polynomial gradient resistivity profiles 523b and 523c, as shown in FIG. 5. While only first and second degree polynomial gradient profiles are shown in FIG. 5, it should be noted that higher-degree polynomial gradient profiles may also be used, as desired for a particular implementation.

Figure 6:
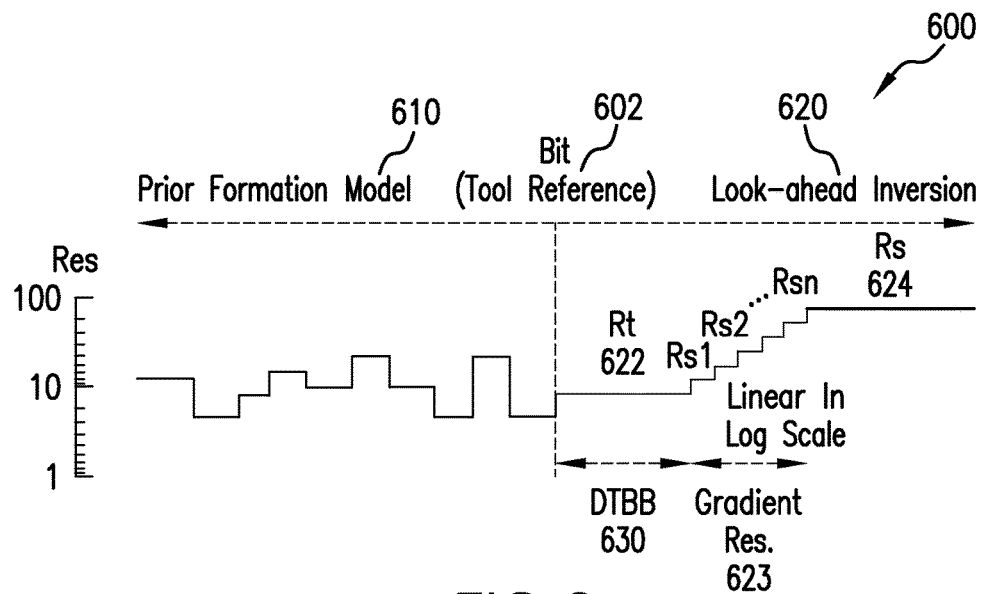
FIG. 6 illustrates an exemplary resistivity profile of a formation model for look-ahead inversion with inverted prior multi-layers behind a LALA tool's reference location and a gradient transition of resistivity values in an ascending order for layers ahead.

FIG. 6 illustrates an exemplary resistivity profile of a formation model 600 for performing look-ahead inversion with a logarithmically linear gradient resistivity profile 620 representing a distribution of resistivity between the current layer and various layers ahead of a tool reference 602. As shown in FIG. 6, a gradient transition area 623 including a plurality of gradient resistivity values ($Rs_1$, $Rs_2$, ..., $Rs_n$) between a resistivity (Rt) 622 of a current formation layer and a resistivity (Rs) 624 of a shoulder-bed layer ahead of the current layer. In one or more embodiments, the gradient resistivity values may be used to implement a linear logarithmical interpolation between the current formation layer resistivity (Rt) 622 and shoulder-bed layer resistivity (Rs) 624. In this way, formation model 600 may be used to provide more accurate look-ahead inversion results when dealing with complex formation profiles.

In one or more embodiments, the results of the look-ahead inversion performed using formation model 600 may include, for example, values of formation resistivity between the current layer formation resistivity 622 and shoulder-bed resistivity 624, a distance to shoulder-bed boundary (DTBB) 630, gradient resistivity values within the gradient transition area of the formation between the current and shoulder-bed layers, a thickness or width of gradient transition area 623, and a number of formation layers within gradient transition area 623. As shown in FIG. 6, the gradient resistivity values in the transition area represented by gradient resistivity profile 623 of formation model 600 may be in ascending order, descending order, or the same overall.

Figure 7:
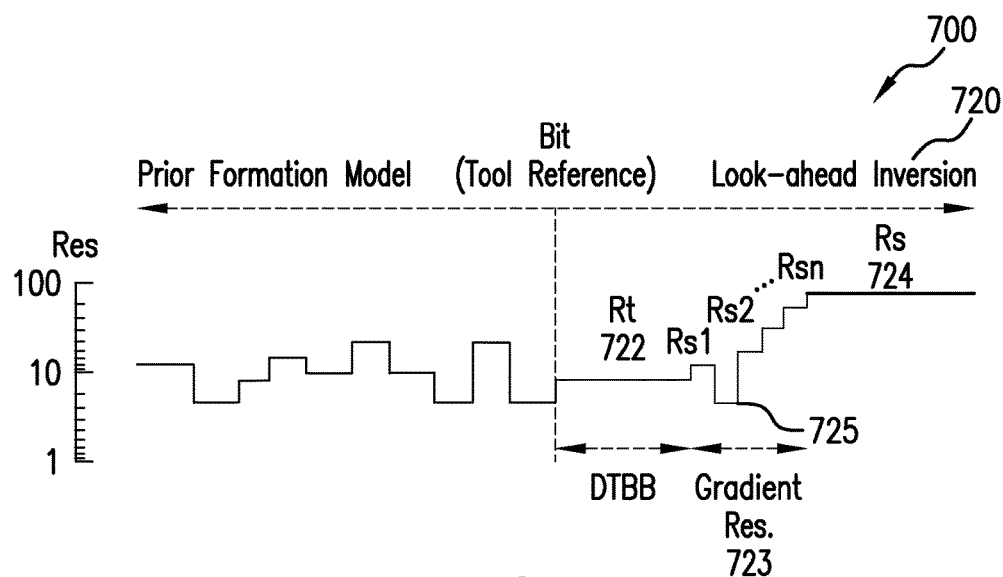
FIG. 7 illustrates an exemplary resistivity profile of a formation model for look-ahead inversion with inverted prior multi-layers behind a LALA tool's reference location and a gradient transition of resistivity values in a random order for layers ahead.

However, the gradient resistivity profiles of the actual formation may be in a random order, e.g., based on initial formation models derived from offset well data and/or look-ahead signals sufficiently sensitive to the transition area of the formation. Accordingly, the resistivity profile of the formation model may be modified to reflect this. For example, FIG. 7 illustrates a formation model 700 including a look-ahead profile 720 with a gradient transition area 723 in which the estimated value of formation resistivity (Rs2) for a particular formation layer 725 may have a lower resistivity than the two surrounding layers. Such a gradient resistivity profile may be used to achieve higher degree polynomial responses.

Figure 8:
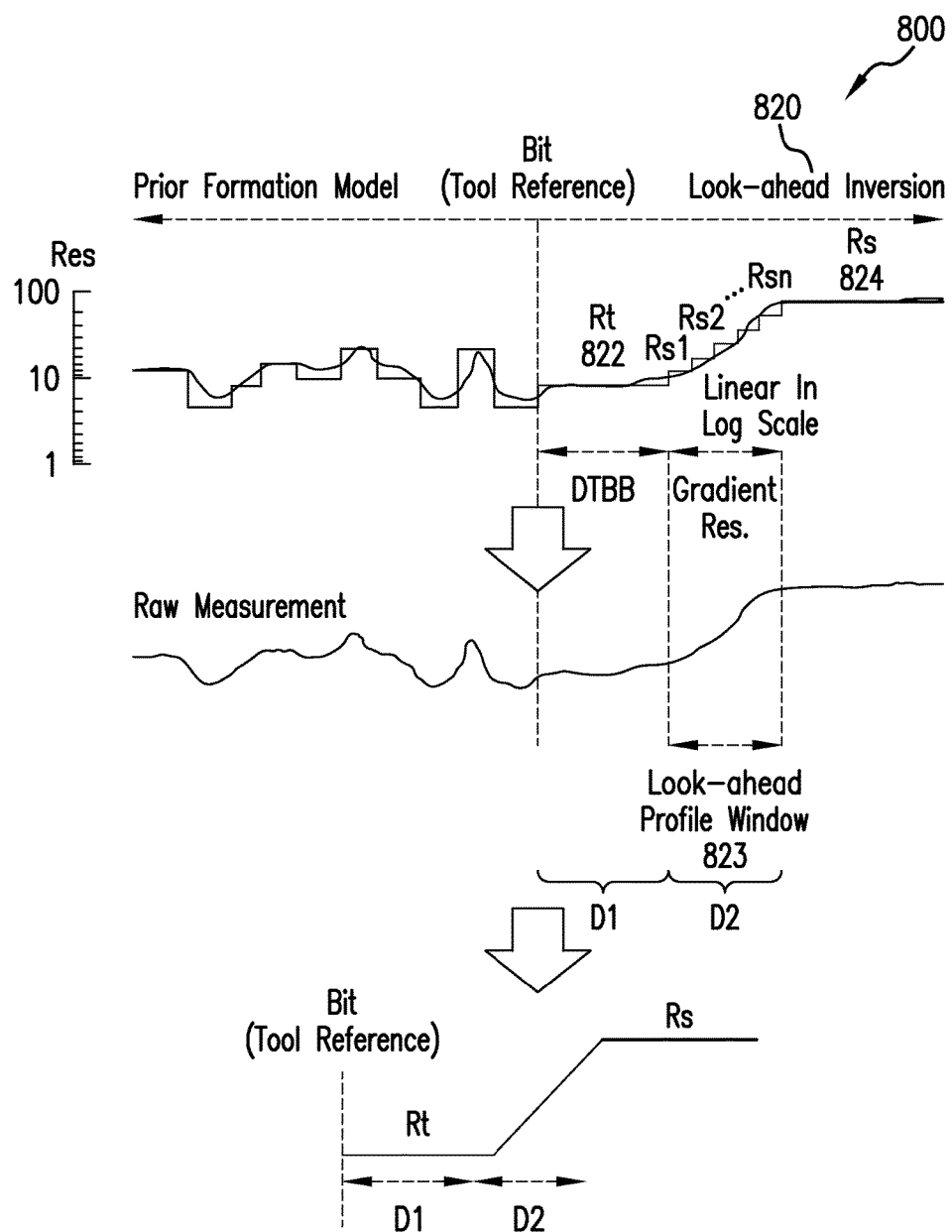
FIG. 8 shows a comparison between a log of formation resistivity measurements for different layers of a formation and a resistivity profile for a model of the formation for performing LALA inversion.

The resistivity profiles of the above-described formation models of FIGS. 6 and 7 may be used to attain a better match between forward modeling responses and raw field measurements obtained from the LALA tool. FIG. 8 shows a comparison between a log of formation resistivity measurements for different layers of a formation and a resistivity profile for a model 800 of the formation. As shown in FIG. 8, a look-ahead formation profile 820 in the inversion may include a current formation resistivity Rt 822, a resistivity Rs 824 of a shoulder-bed ahead, a distance to the shoulder-bed boundary (DTBB or "D1"), and a look-ahead profile window 823. Look-ahead profile window 823 may represent a gradient transition area of a certain thickness or distance ("D2") between the current and shoulder-bed layer resistivities Rt 822 and Rs 824. The use of gradient resistivity profiles in the gradient transition area represented by profile window 823 may enable the look-ahead inversion to obtain forward modeling responses that better match field measurements of complex formation properties.

In one or more embodiments, values for current formation resistivity (Rt) 822, shoulder-bed resistivity (Rs) 824, distance D1, and distance D2 of the gradient transition area within profile window 823 may be estimated based on the look-ahead inversion. Alternatively, one or more of these parameters may be determined based on measurements from offset wells or other data sources for the inversion. For example, the current formation resistivity (Rt) 822 may be fixed or held constant at some predetermined value or may be regulated according to one or more conditions applied in the inversion based on shallow resistivity measurements collected at the tool reference location (e.g., at the drill bit). It also may be possible to apply regulations to constrain the values of D2 and/or shoulder-bed resistivity (Rs) 824. Such regulations or constraints may be based on, for example, resistivity logs obtained from one or more offset wells. In one or more embodiments, the desired look-ahead inversion parameter may be distance D1, indicating the actual distance from a current layer of the formation to a desired layer ahead.

Table 1 below presents the possible combinations of inverted parameters and outputs for the formation model and associated look-ahead inversion scheme of FIG. 8:

| | Inversion Parameters | | | |
|---|---|---|---|---|
| | Rt | Rs | D1 | D2 |
| Inverted Outputs | Unknown | Unknown | Unknown | Unknown |
| | Known or constrained | Unknown | Unknown | Unknown |
| | Known or constrained | Known or constrained | Unknown | Unknown |
| | Known or constrained | Unknown | Unknown | Known or constrained |
| | Known or constrained | Unknown | Unknown | Known or constrained |

Figure 9:
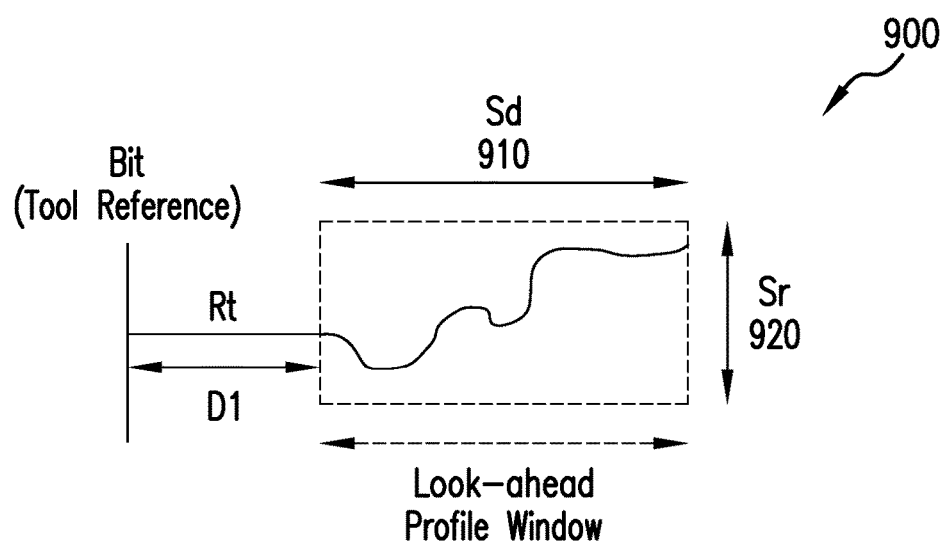
FIG. 9 illustrates an exemplary generalized look-ahead profile window for representing a logarithmically linear, polynomial, or other resistivity profiles in the look-ahead inversion.

FIG. 9 illustrates an example of a generalized profile window 900 for representing a logarithmically linear, polynomial, or any other formation resistivity profile between the current layer and one or more layers ahead. In one or more embodiments, the resistivity profile in look-ahead profile window 900 may be determined based on information obtained from one or more offset wells, deep and shallow measurements, or random selections. For example, a Monte Carlo processing technique or a stochastic simulation technique may be used to determine the resistivity profile based at least in part on random or pseudo-random variables. The corresponding inversion may optimize the profile according to any of various error minimization techniques including, but not limited to, minimum misfit, least-square error, or other data fitting techniques. However, due to the uncertainty of formation continuity between wells, a scaling factor 910 for depth ("Sd") and a scaling factor 920 for resistivity ("Sr") may be applied in the look-ahead inversion so as to grow or shrink profile window 900 and thereby, achieve a better match between forward modeling responses and raw measurements.

Table 2 below presents possible combinations of inverted parameters resulting from a look-ahead inversion with a generalized profile window, such as profile window 900 of FIG. 9:

| | Inversion Parameters | | | |
|---|---|---|---|---|
| | Rt | Rs | D1 | D2 |
| Inverted Outputs | Unknown | Unknown | Unknown | Unknown |
| | Known or constrained | Unknown | Unknown | Unknown |
| | Known or constrained | Unknown | Known or constrained | Unknown |
| | Known or constrained | Unknown | Unknown | Known or constrained |
| | Known or constrained | Unknown | Known or constrained | Known or constrained |

Figure 10:
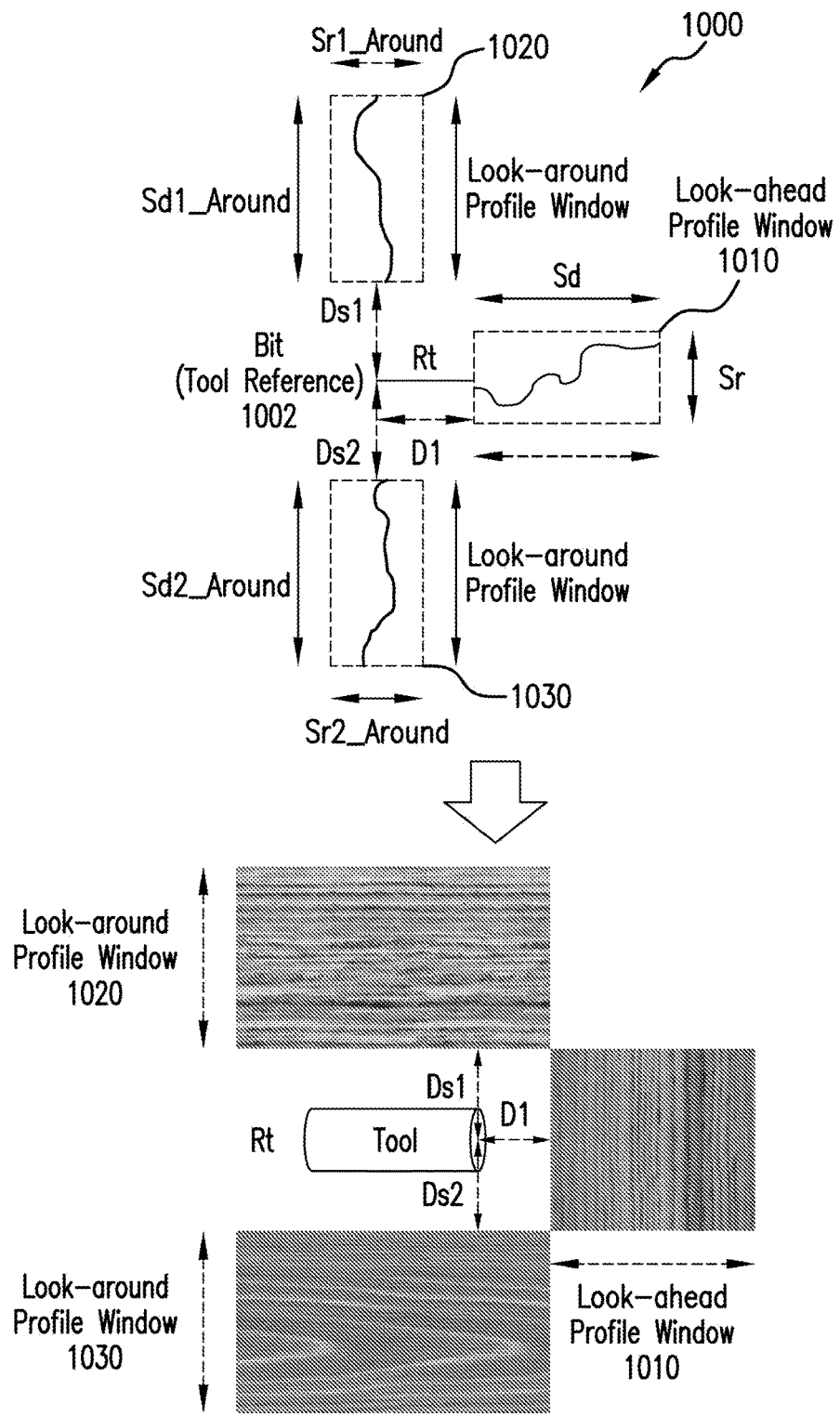
FIG. 10 illustrates exemplary generalized look-ahead and look-around profile windows for representing logarithmically linear, polynomial, or other resistivity profiles in the look-ahead inversion.

In one or more embodiments, such a generalized profile window may be utilized for both look-ahead and look-around inversion, which may be particularly useful for horizontal drilling. As shown in the example of FIG. 10, in addition to a look-ahead profile window 1010, two look-around profile windows 1020 and 1030 may be used in the inversion. In FIG. 10, "Ds1" and "Ds2" represent distances from a tool reference location 1002 to look-around profile windows 1020 and 1030 above and below the tool reference 1002, respectively. "Sd1_Around" and "Sr1_Around" in this example represent scaling factors in depth and in resistivity, respectively, for look-around profile window 1020 above tool reference 1002. Similarly, "Sd2_Around" and "Sr2_Around" represent scaling factors in depth and in resistivity, respectively, for look-around profile window 1030 below the tool reference 1002. In areas of the formation where different profile windows may overlap, for example, at the corners between look-ahead profile window 1010 and look-around profile window 1020 or 1030, the inversion may be performed using either the look-ahead profile window or the appropriate look-around profile window. Alternatively, an average of the overlapping look-ahead and look-around profile windows may be used in the inversion for such formation areas.

Owing to very deep sensitivities, a LALA tool integrated within a drilling assembly may be capable of measuring formation properties in deeper formation zones ahead of the tool's current location and before they are penetrated by the drill bit. The results of the LALA inversion performed based on such measurements may be used to actively control the drilling assembly and steer the wellbore being drilled toward desired zones or to avoid potential hazards in advance. However, a large amount of data from the LALA tool may need to be processed in order for the LALA inversion to be performed during the drilling operation. As sending such data via telemetry or other communication pathway to a surface control unit for processing may cause significant delays, it may be desirable to process the data from the LALA tool in real-time and perform the LALA inversion downhole. As will be described in further detail below with respect to FIG. 11, a downhole automation unit may be used to implement such a real-time data processing and inversion scheme for automating the active geosteering process in a closed loop drilling application.

Figure 11:
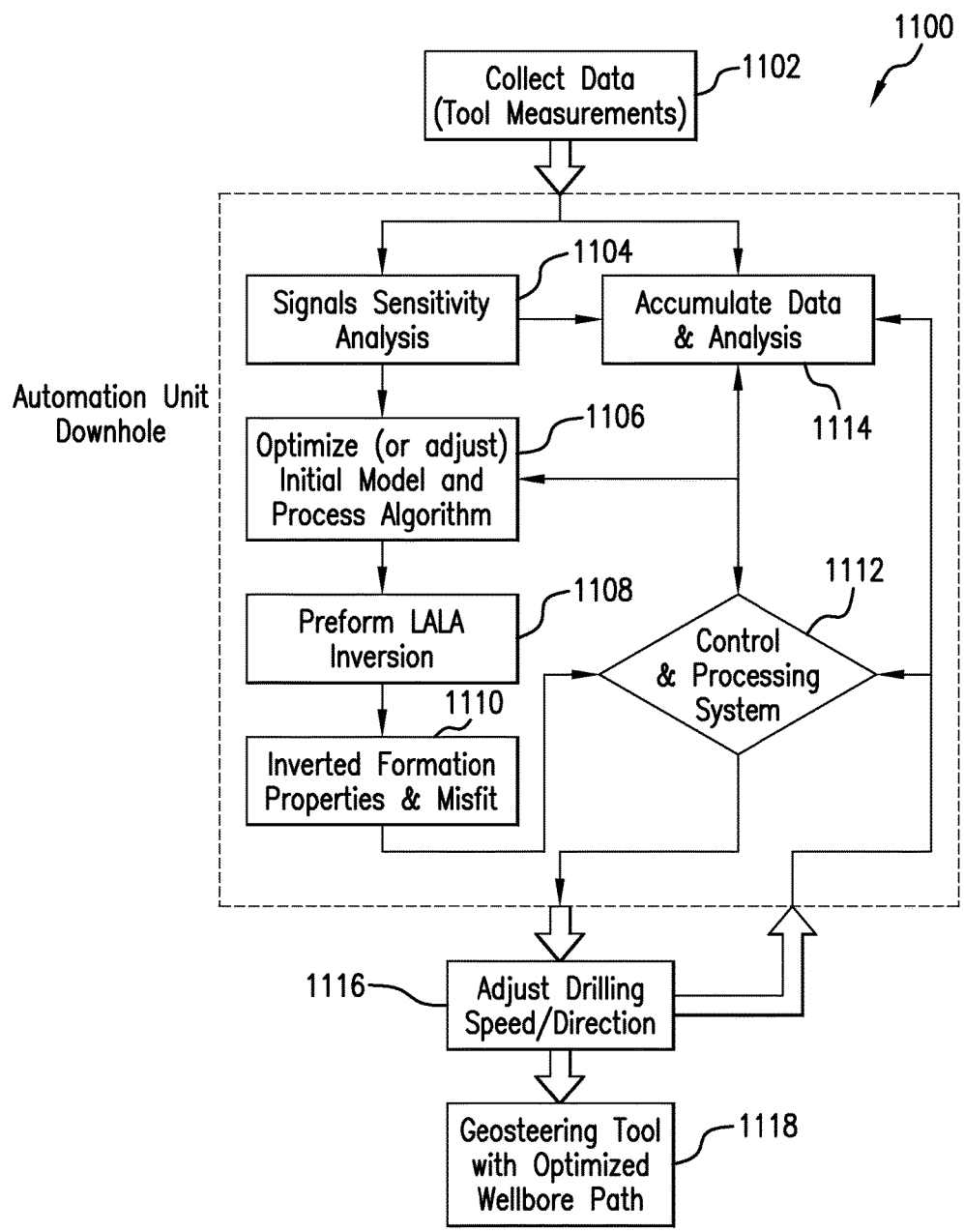
FIG. 11 is a flowchart of an exemplary processing scheme for automating knowledge-based geosteering inversion in a downhole closed-loop drilling application.

FIG. 11 is a flowchart of an exemplary processing scheme 1100 for automating LALA inversion and geosteering in a downhole closed-loop drilling application. The steps of processing scheme 1100 may be performed by, for example, a downhole automation unit integrated within a drilling assembly disposed within a wellbore being drilled. As will be described in further detail below, the automation unit may be configured to operate alongside a LALA tool (e.g., LALA tool 200 of FIG. 2, as described above) of the drilling assembly for processing data collected by the LALA tool and providing automated geosteering control during the drilling operation. Thus, as shown in FIG. 11, processing scheme 1100 may begin in step 1102, in which the automation unit obtains data from the LALA tool. As described above, such data may include measurements of formation properties at a current depth of the tool within the formation. Rather than sending the data up-hole to be processed by a control unit located at the surface, the data obtained in step 1102 may be provided as input to the downhole automation unit. It should be appreciated that such input data may be obtained directly from the LALA tool or from a local memory accessible to the automation unit and in which the data may be stored as it is collected by the LALA tool. Such a memory may be any type of electronic storage medium coupled to or integrated within the automation unit.

In step 1104, the automation unit may analyze the sensitivity of LALA signals included as part of the input data obtained from the LALA tool. In step 1106, an initial formation model for performing LALA inversion may be defined based on the obtained data and analysis thereof. In one or more embodiments, the initial formation model may be selected from a set of predefined models. Such predefined models may include, for example and without limitation, one or more of the above-described formation models of FIGS. 4-10. Once a suitable model has been defined or selected, an appropriate processing algorithm may also be selected. In one or more embodiments, such a processing algorithm may be related to the type of formation model that is defined or selected in step 1106. The predefined models and related processing algorithms may be stored, for example, in the above-described memory accessible to the automation unit.

Processing scheme 1100 may then proceed to step 1108, which includes performing LALA inversion based on the input data obtained in step 1102, the formation model as defined or selected in step 1106, and selected processing algorithm. The outputs or results of the inversion may include inverted formation properties including, for example, a current formation resistivity (Rt), a shoulder-bed formation resistivity (Rs), and a distance to the shoulder-bed boundary (DTBB), as described above. Step 1110 of processing scheme 1100 may include determining whether there is any deviation or mismatch between the inverted formation properties resulting from the inversion and the field data obtained in step 1102. Step 1110 may include, for example, determining whether a modeled resistivity profile based on the inverted modeling response fits with the measured resistivity log. In step 1112, any misfit between the inverted modeling responses and field data may be stored and processed, e.g., by a control and processing system of the automation unit.

In step 1114, the inversion results (e.g., inverted formation properties) and processed misfit data (e.g., inverted misfit of modeled properties at a certain depth) may be further analyzed in conjunction with data accumulated by the LALA tool during preceding stages of the drilling operation. Such data may include, for example, raw measurements and information relating to operating parameters, e.g., drilling direction and speed, of the drilling assembly. Such information may include, for example, a record of the drilling direction and speed set for drilling a path of the wellbore within a certain depth range. In one or more embodiments, the results of such analysis may be used to further optimize or refine the initial formation model that was previously defined/selected for the LALA inversion. For example, the initial formation model may be updated to minimize any deviation determined between formation properties estimated using the formation model and actual formation properties measured during the drilling operation.

The results of the analysis performed in step 1114 may also be used in step 1116 to make any appropriate adjustments to one or more of the operating parameters (e.g., drilling speed and/or direction) of the drilling assembly so as to adjust or optimize a planned wellbore path, e.g., toward a desired target formation zone or away from a predetermined hazard zone. In step 1118, the operating adjustments may be provided as input to a drill motor or controller thereof to steer the drilling assembly and wellbore along the adjusted/optimized path. In one or more embodiments, a data accumulation and analysis component (or "data accumulator and analyzer") of the downhole automation unit may be used to perform the analysis of step 1114 and communicate the results to the aforementioned control and processing system. The control and processing system in turn may communicate the appropriate operating parameter adjustments to the drill motor or controller for actively steering the drilling assembly along a desired wellbore path.

In an example, a target formation zone may be relatively far away from the current location of the drill bit and LALA tool within the wellbore being drilled. Consequently, raw measurements from the LALA tool may have very weak sensitivity with respect to formation properties in the target zone. As a result, the degree of uncertainty in the inversion (and/or inversion misfit) may be relatively high and inversion results may be unreliable. The downhole automation unit in this example may therefore select a simplified two-layer formation model as the initial model to be used for performing LALA inversion and adjusting one or more operating parameters (e.g., drilling speed and/or direction) based on the inversion results. As the LALA tool approaches the target zone over the course of the drilling operation, measurements having increasingly greater sensitivity to the formation properties in the target zone may be obtained.

In one or more embodiments, the above-described data accumulator and analyzer of the downhole automation unit may initiate a request to the control and processing system to reduce the current drilling speed such that more data can be collected within a smaller depth range. This may enable higher quality raw measurements to be obtained from the LALA tool and a more complex formation model to be used for representing formation properties in greater detail based on such measurements. In one or more embodiments, the complex formation model may be a version of the initial model that was previously defined or selected in step 1106 and that has been optimized or refined based on the additional measurements obtained from the LALA tool. Such an optimized formation model may then be used to control drilling direction and optimize well placement in real-time. It should be appreciated that such high-quality measurements may require more processing time and that the computation speed of the LALA inversion may be reduced as a result. Consequently, a slower drilling speeds may be needed in order to have enough lead time for the measurements to be processed and LALA inversion results to be obtained.

In a further example, the above-described processing scheme 1100 may be applied in a similar manner to avoid a hazardous zone of the formation. An example of such a hazard zone may be a high pore pressure zone that may compromise wellbore stability. As there is generally a strong correlation between high pore pressure zones and formation resistivity, sudden changes in formation resistivity may provide an indication of abrupt changes in pore pressure. In one or more embodiments, the results of the inversion based on similar high-quality measurements obtained from the LALA tool, as described above, may be used to identify a hazard zone ahead of the current location of the drill bit (and the LALA tool's reference). Once the hazard zone in this example is identified, appropriate adjustments to the drilling direction and/or speed may be made to adjust the wellbore path and avoid drilling in the hazard zone. Such drilling adjustments may be made by, for example, the control and processing system of the downhole automation unit based on information provided by the data accumulator and analyzer, as described above.

In one or more embodiments, a hybrid parallel computation system may be utilized in the downhole automation unit to adjust or optimize the initial formation model and related process algorithm for LALA inversion. Further, multiple formation models may be defined or selected (step 1106) as suitable initial models for performing the LALA inversion (step 1108). The hybrid computation system may be used, for example, to optimize all or a subset of the most suitable initial models and related processing algorithms simultaneously. Such optimization may performed based at least in part on results of accumulated data analysis performed in the automation unit (step 1112), as described above. An output of the processing performed by the automation unit in this example may be an inverted formation model that provides the best match or least misfit between forward modeling responses and measured field data.

Figure 12:
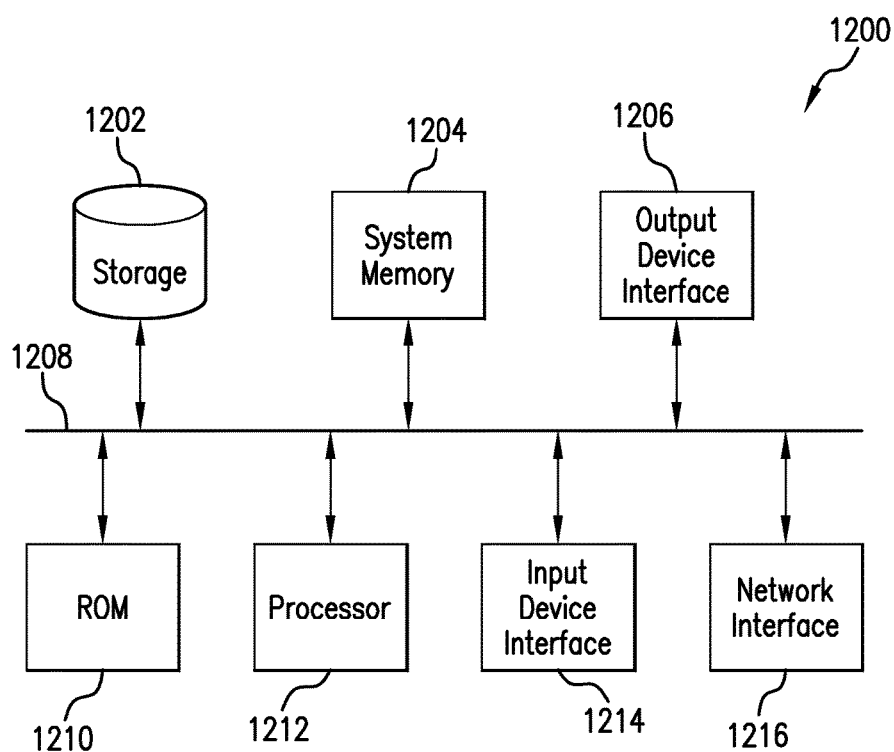
FIG. 12 is a block diagram illustrating an example of a computer system in which embodiments of the present disclosure may be implemented.

FIG. 12 is a block diagram of an exemplary computer system 1200 in which embodiments of the present disclosure may be implemented. For example, the steps of method 300 of FIG. 3, as described above, may be implemented using system 1200. System 1200 can be a computer, phone, PDA, or any other type of electronic device. Such an electronic device includes various types of computer readable media and interfaces for various other types of computer readable media. As shown in FIG. 12, system 1200 includes a permanent storage device 1202, a system memory 1204, an output device interface 1206, a system communications bus 1208, a read-only memory (ROM) 1210, processing unit(s) 1212, an input device interface 1214, and a network interface 1216.

Bus 1208 collectively represents all system, peripheral, and chipset buses that communicatively connect the numerous internal devices of system 1200. For instance, bus 1208 communicatively connects processing unit(s) 1212 with ROM 1210, system memory 1204, and permanent storage device 1202.

From these various memory units, processing unit(s) 1212 retrieves instructions to execute and data to process in order to execute the processes of the subject disclosure. The processing unit(s) can be a single processor or a multi-core processor in different implementations.

ROM 1210 stores static data and instructions that are needed by processing unit(s) 1212 and other modules of system 1200. Permanent storage device 1202, on the other hand, is a read-and-write memory device. This device is a non-volatile memory unit that stores instructions and data even when system 1200 is off. Some implementations of the subject disclosure use a mass-storage device (such as a magnetic or optical disk and its corresponding disk drive) as permanent storage device 1202.

Other implementations use a removable storage device (such as a floppy disk, flash drive, and its corresponding disk drive) as permanent storage device 1202. Like permanent storage device 1202, system memory 1204 is a read-and-write memory device. However, unlike storage device 1202, system memory 1204 is a volatile read-and-write memory, such a random access memory. System memory 1204 stores some of the instructions and data that the processor needs at runtime. In some implementations, the processes of the subject disclosure are stored in system memory 1204, permanent storage device 1202, and/or ROM 1210. For example, the various memory units include instructions for computer aided pipe string design based on existing string designs in accordance with some implementations. From these various memory units, processing unit(s) 1212 retrieves instructions to execute and data to process in order to execute the processes of some implementations.

Bus 1208 also connects to input and output device interfaces 1214 and 1206. Input device interface 1214 enables the user to communicate information and select commands to the system 1200. Input devices used with input device interface 1214 include, for example, alphanumeric, QWERTY, or T9 keyboards, microphones, and pointing devices (also called "cursor control devices"). Output device interfaces 1206 enables, for example, the display of images generated by the system 1200. Output devices used with output device interface 1206 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 12, bus 1208 also couples system 1200 to a public or private network (not shown) or combination of networks through a network interface 1216. Such a network may include, for example, a local area network ("LAN"), such as an Intranet, or a wide area network ("WAN"), such as the Internet. Any or all components of system 1200 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of method 300 of FIG. 3, as described above, may be implemented using system 1200 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for performing LALA inversion and geosteering. For example, the knowledge-based LALA inversion techniques disclosed herein allow formation models to be defined with various formation profile windows that can be adjusted or modified as desired for different geosteering applications and measurements of formation properties. Advantages of the present disclosure include, but are not limited to, enabling more accurate LALA inversion results to be obtained for making better geosteering decisions during a drilling operation.

In one embodiment of the present disclosure, a computer-implemented method for performing look-ahead inversion includes: obtaining measurements of formation properties accumulated by a downhole look-ahead look-around (LALA) tool during different stages of drilling a wellbore through a plurality of layers behind a current layer of an underground formation; determining a distribution of formation properties for the plurality of layers behind the current layer of the underground formation based on the measurements accumulated by the downhole LALA tool; defining a formation model for look-ahead inversion based on the determined distribution of formation properties behind the current layer; obtaining measurements of the current layer's formation properties collected by the downhole LALA tool; and estimating a distribution of formation properties for one or more layers ahead of the current layer based on the formation model and the measurements of formation properties obtained for the current layer, the estimated distribution including a gradient transition of formation properties between the current layer and the one or more layers ahead of the current layer.

In a further embodiment, the formation properties of the current layer are measured by the LALA tool relative to a tool reference representing a current depth of the LALA tool within the underground formation. In yet a further embodiment, the LALA tool is integrated within a drilling assembly disposed within the wellbore being drilled and the tool reference corresponds to a location of a drill bit at a distal end of the drilling assembly. In yet a further embodiment, the measurements include shallow measurements of formation properties within a limited detection range surrounding the LALA tool and ultra-deep measurements of formation properties within an extended detection range around and ahead of the tool reference. In yet a further embodiment, the LALA tool is an electromagnetic resistivity tool and the measurements obtained from the LALA tool include values of formation resistivity. In yet a further embodiment, the estimated formation properties include a resistivity of the current layer, a resistivity of each of the one or more layers ahead of the current layer, and a distance between the current layer and the one or more layers ahead of the current layer. The estimated distribution includes a gradient transition of formation resistivity between the current layer and the one or more layers ahead of the current layer. In yet a further embodiment, the estimated distribution is based on a gradient profile of resistivity values transitioning between the current layer and the one or more layers ahead of the current layer in an ascending order, a descending order, or a random order. In yet a further embodiment, the gradient profile is based on one or more profile windows representing the estimated distribution of formation properties ahead of and around the tool reference, and each of the one or more profile windows is adjustable based on one or more scaling factors associated with that profile window. In yet a further embodiment, the formation model is defined by: comparing the measurements of the current layer's formation properties with a previously estimated distribution of formation properties based on an initial formation model defined in a preceding stage of drilling the wellbore; and defining the formation model by updating the initial formation model based on the comparison so as to minimize a deviation between the previously estimated distribution of formation properties and the measurements of the current layer's formation properties.

In yet a further embodiment, the above-described method further includes: optimizing a path of the wellbore being drilled through the underground formation toward a target layer ahead of the current layer based on the estimated distribution of formation properties according to the updated formation model; and adjusting one or more operating parameters of the drilling assembly for steering the wellbore as it is drilled along the optimized path toward the target layer. In yet a further embodiment, adjusting one or more operating parameters comprises adjusting at least one of a speed and a direction of the drilling assembly as the wellbore is drilled toward the target layer of the underground formation ahead of the current layer. In yet a further embodiment, the look-ahead inversion, including the comparing, updating, optimizing and adjusting, is performed in real-time by a downhole automation unit coupled to the LALA tool in response to measurements collected by the LALA tool during the different stages of drilling the wellbore.

In another embodiment of the present disclosure, a computer-implemented method for performing look-ahead inversion includes: obtaining measurements of formation properties accumulated by a downhole look-ahead look-around (LALA) tool during different stages of a drilling operation through a plurality of layers behind a current layer of an underground formation; determining an initial distribution profile of formation properties distributed across the plurality of layers behind the current layer of the underground formation based on the measurements accumulated by the downhole LALA tool; obtaining from the downhole LALA tool measurements of formation properties for the current layer of the underground formation; determining a look-ahead profile for estimating formation properties distributed between the current layer and one or more layers ahead of the current layer based on the initial distribution profile and the measurements obtained for the current layer, the look-ahead profile indicating a gradient transition of formation properties between the current layer and the one or more layers ahead; and defining a formation model for performing look-ahead inversion according to the look-ahead profile.

In a further embodiment of the present disclosure, a system for performing look-ahead inversion includes a drill string disposed within a wellbore being drilled through an underground formation, a LALA tool attached to the drill string for measuring formation properties during different stages of drilling the wellbore, at least one processor, and a memory coupled to the processor. The memory stores instructions, which when executed by the processor, cause the processor to perform functions, including functions to: obtain measurements of formation properties accumulated by a downhole look-ahead look-around (LALA) tool during different stages of drilling a wellbore through a plurality of layers behind a current layer of an underground formation, wherein the downhole LALA tool is integrated within a drilling assembly disposed within the wellbore being drilled; determine a distribution of formation properties for the plurality of layers behind the current layer of the underground formation based on the measurements accumulated by the downhole LALA tool; define a formation model for look-ahead inversion based on the determined distribution of formation properties behind the current layer; obtain measurements of the current layer's formation properties collected by the downhole LALA tool; and estimate a distribution of formation properties for one or more layers ahead of the current layer based on the formation model and the measurements of formation properties obtained for the current layer, the estimated distribution including a gradient transition of formation properties between the current layer and the one or more layers ahead of the current layer. In one or more embodiments, the system also includes a drill controller attached to the drill string and coupled to the processor for steering the drill string along a path of the wellbore being drilled through the underground formation.

In yet a further embodiment of the present disclosure, a computer-readable storage medium has instructions stored therein, which when executed by a computer cause the computer to perform a plurality of functions, including functions to: obtain measurements of formation properties accumulated by a downhole look-ahead look-around (LALA) tool during different stages of drilling a wellbore through a plurality of layers behind a current layer of an underground formation; determine a distribution of formation properties for the plurality of layers behind the current layer of the underground formation based on the measurements accumulated by the downhole LALA tool; define a formation model for look-ahead inversion based on the determined distribution of formation properties behind the current layer; obtain measurements of the current layer's formation properties collected by the downhole LALA tool; and estimate a distribution of formation properties for one or more layers ahead of the current layer based on the formation model and the measurements of formation properties obtained for the current layer, the estimated distribution including a gradient transition of formation properties between the current layer and the one or more layers ahead of the current layer.

While specific details about the above embodiments have been described, the above hardware and software descriptions are intended merely as example embodiments and are not intended to limit the structure or implementation of the disclosed embodiments. For instance, although many other internal components of the system 1200 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method for performing look-ahead inversion for geosteering, the method comprising:
    obtaining measurements of formation properties accumulated by a downhole look-ahead look-around (LALA) tool during different stages of drilling a wellbore through a plurality of layers behind a current layer of an underground formation;
    determining a distribution of formation properties for the plurality of layers behind the current layer of the underground formation based on the measurements accumulated by the downhole LALA tool;
    defining a formation model for look-ahead inversion based on the determined distribution of formation properties behind the current layer;
    obtaining measurements of the current layer's formation properties collected by the downhole LALA tool;
    estimating a distribution of formation properties for one or more layers ahead of the current layer based on the formation model and the measurements of formation properties obtained for the current layer, the estimated distribution including a gradient transition of formation properties in an area of the underground formation between the current layer and the one or more layers ahead of the current layer; and
    steering the wellbore along a path through the underground formation toward a target layer ahead of the current layer, based on the estimated distribution of formation properties.

2. The method of claim 1, wherein the formation properties of the current layer are measured by the LALA tool relative to a tool reference representing a current depth of the LALA tool within the underground formation.

3. The method of claim 2, wherein the LALA tool is integrated within a drilling assembly disposed within the wellbore being drilled and the tool reference corresponds to a location of a drill bit at a distal end of the drilling assembly.

4. The method of claim 2, wherein the measurements include shallow measurements of formation properties within a limited detection range surrounding the LALA tool and ultra-deep measurements of formation properties within an extended detection range around and ahead of the tool reference.

5. The method of claim 4, wherein the LALA tool is an electromagnetic resistivity tool and the measurements obtained from the LALA tool include values of formation resistivity.

6. The method of claim 5, wherein the estimated formation properties include a resistivity of each of the one or more layers ahead of the current layer, and a distance between the current layer and the one or more layers ahead of the current layer, and the estimated distribution includes a gradient transition of formation resistivity between the current layer and the one or more layers ahead of the current layer.

7. The method of claim 6, wherein the estimated distribution is based on a gradient profile of resistivity values transitioning between the current layer and the one or more layers ahead of the current layer in an ascending order, a descending order, or a random order.

8. The method of claim 7, wherein the gradient profile is based on one or more profile windows representing the estimated distribution of formation properties ahead of and around the tool reference, and each of the one or more profile windows is adjustable based on one or more scaling factors associated with that profile window.

9. The method of claim 1, further comprising:
comparing the measurements of the current layer's formation properties with a previously estimated distribution of formation properties based on the formation model defined in a preceding stage of drilling the wellbore; and
updating the formation model based on the comparison so as to minimize a deviation between the previously estimated distribution of formation properties and the measurements of the current layer's formation properties.

10. The method of claim 9, further comprising:
optimizing the path of the wellbore being drilled through the underground formation toward the target layer, based on a distribution of formation properties estimated using the updated formation model; and
adjusting one or more operating parameters of the drilling assembly for steering the wellbore as it is drilled along the optimized path toward the target layer.

11. The method of claim 10, wherein adjusting one or more operating parameters comprises adjusting at least one of a speed or a direction of the drilling assembly as the wellbore is drilled toward the target layer of the underground formation ahead of the current layer.

12. The method of claim 11, wherein the look-ahead inversion, including the comparing, updating, optimizing and adjusting, is performed in real-time by a downhole automation unit coupled to the LALA tool in response to measurements collected by the LALA tool during the different stages of drilling the wellbore.

13. A computer-implemented method for performing look-ahead inversion, the method comprising:

obtaining measurements of formation properties accumulated by a downhole look-ahead look-around (LALA) tool during different stages of a drilling operation through a plurality of layers behind a current layer of an underground formation;
determining an initial distribution profile of formation properties distributed across the plurality of layers behind the current layer of the underground formation based on the measurements accumulated by the downhole LALA tool;
obtaining from the downhole LALA tool measurements of formation properties for the current layer of the underground formation;
determining a look-ahead profile for estimating formation properties distributed between the current layer and one or more layers ahead of the current layer based on the initial distribution profile and the measurements obtained for the current layer, the look-ahead profile indicating a gradient transition of formation properties in an area of the underground formation between the current layer and the one or more layers ahead;
defining a formation model according to the look-ahead profile;
performing look-ahead inversion to estimate a distribution of formation properties for one or more layers ahead of the current layer based on the formation model; and
steering the wellbore along a path through the underground formation toward a target layer ahead of the current layer, based on the estimated distribution of formation properties.

14. A system for performing look-ahead inversion for geosteering, the system comprising:
a drill string disposed within a wellbore being drilled through an underground formation;
a look-ahead look-around (LALA) tool attached to the drill string for measuring formation properties during different stages of drilling the wellbore;
at least one processor coupled to the LALA tool; and
a memory coupled to the processor having instructions stored therein, which when executed by the processor, cause the processor to perform functions, including functions to:
obtain measurements of formation properties accumulated by the LALA tool for a plurality of layers behind a current layer of the underground formation;
determine a distribution of formation properties for the plurality of layers behind the current layer of the underground formation based on the measurements accumulated by the LALA tool;
define a formation model for look-ahead inversion based on the determined distribution of formation properties behind the current layer;
obtain measurements of the current layer's formation properties collected by the LALA tool;
estimate a distribution of formation properties for one or more layers ahead of the current layer based on the formation model and the measurements of formation properties obtained for the current layer, the estimated distribution including a gradient transition of formation properties in an area of the underground formation between the current layer and the one or more layers ahead of the current layer; and
steer the drill string so as to drill the wellbore along a path through the underground formation toward a target layer ahead of the current layer, based on the estimated distribution of formation properties.

15. The system of claim 14, wherein the formation properties of the current layer are measured by the LALA tool relative to a tool reference representing a current depth of the LALA tool within the underground formation, the tool reference corresponding to a location of a drill bit at a distal end of the drilling string.

16. The system of claim 15, wherein the measurements include shallow measurements of formation properties within a limited detection range surrounding the LALA tool and ultra-deep measurements of formation properties within an extended detection range around and ahead of the tool reference.

17. The system of claim 16, wherein the LALA tool is an electromagnetic resistivity tool that measures formation resistivity, the estimated formation properties include a resistivity of each of the one or more layers ahead of the current layer, and a distance between the current layer and the one or more layers ahead of the current layer, and the estimated distribution includes a gradient transition of formation resistivity between the current layer and the one or more layers ahead of the current layer.

18. The system of claim 14, further comprising:
a drill controller attached to the drill string and coupled to the processor for steering the drill string along the path of the wellbore being drilled through the underground formation, wherein the functions performed by the processor further include functions to:
compare the measurements of the current layer's formation properties with a previously estimated distribution of formation properties based on the formation model defined in a preceding stage of drilling the wellbore;
update the formation model based on the comparison so as to minimize a deviation between the previously estimated distribution of formation properties and the measurements of the current layer's formation properties;
optimize the path of the wellbore being drilled through the underground formation toward the target layer, based on a distribution of formation properties estimated using the updated formation model; and
send adjustments for one or more operating parameters to the drill controller in order to steer the wellbore along the optimized path toward the target layer of the underground formation ahead of the current layer, the one or more operating parameters including at least one of a speed or a direction of the drill string as the wellbore is drilled toward the target layer.

19. The system of claim 18, wherein the functions performed by the processor are performed in real-time in response to measurements collected by the LALA tool during the different stages of drilling the wellbore.

20. A computer-readable storage medium having instructions stored therein, which when executed by a computer cause the computer to perform a plurality of functions, including functions to:
obtain measurements of formation properties accumulated by a downhole look-ahead look-around (LALA) tool during different stages of drilling a wellbore through a plurality of layers behind a current layer of an underground formation;
determine a distribution of formation properties for the plurality of layers behind the current layer of the underground formation based on the measurements accumulated by the downhole LALA tool;
to define a formation model for look-ahead inversion based on the determined distribution of formation properties behind the current layer;
obtain measurements of the current layer's formation properties collected by the downhole LALA tool;
estimate a distribution of formation properties for one or more layers ahead of the current layer based on the formation model and the measurements of formation properties obtained for the current layer, the estimated distribution including a gradient transition of formation properties in an area of the underground formation between the current layer and the one or more layers ahead of the current layer; and
steer the wellbore along a path through the underground formation toward a target layer ahead of the current layer, based on the estimated distribution of formation properties.

* * * * *